Patented May 22, 1923.                                                                1,456,357

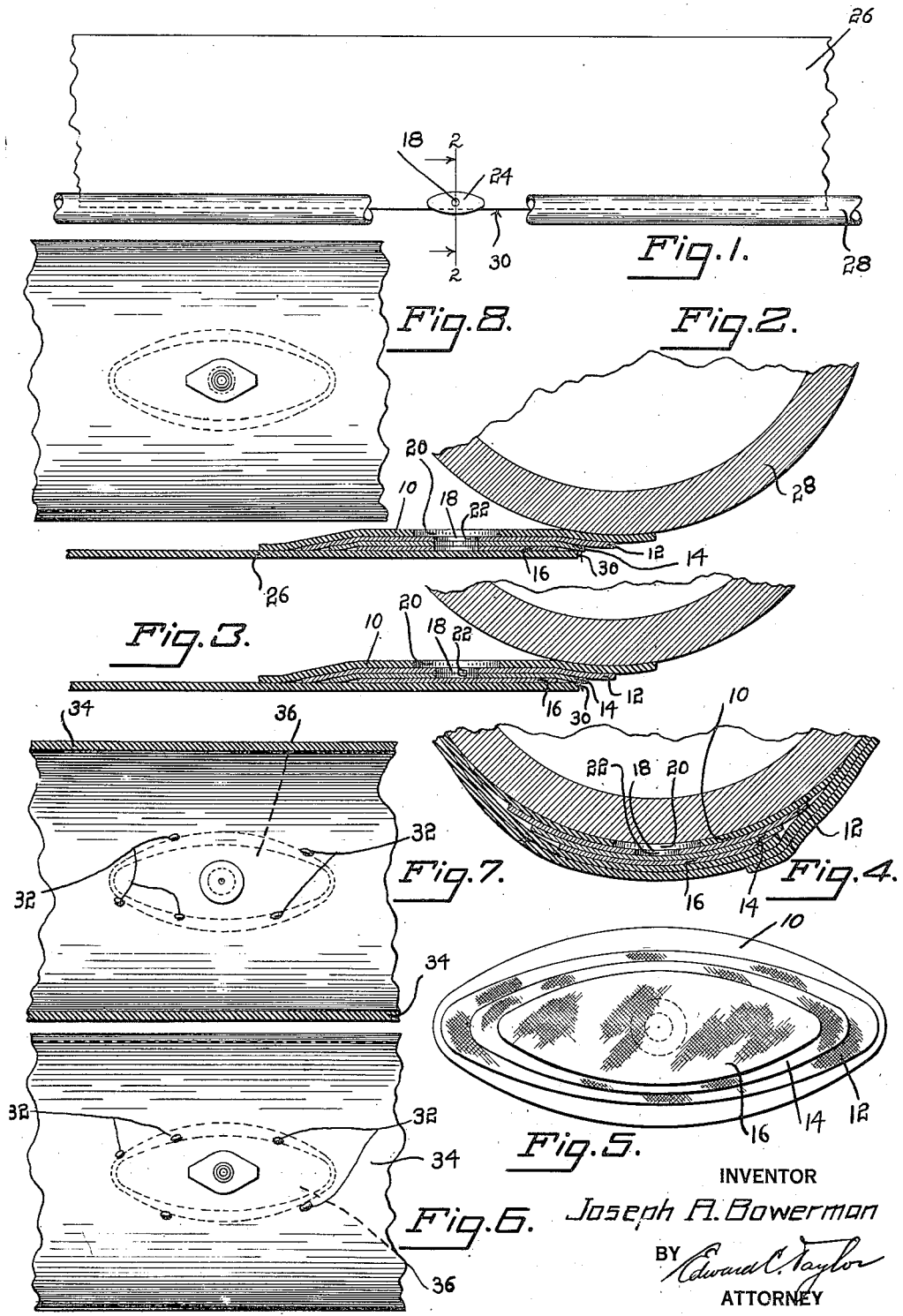

UNITED STATES PATENT OFFICE.

JOSEPH A. BOWERMAN, OF WILBRAHAM, MASSACHUSETTS, ASSIGNOR TO THE FISK RUBBER COMPANY, OF CHICOPEE FALLS, MASSACHUSETTS, A CORPORATION OF MASSACHUSETTS.

VALVE PAD FOR INNER TUBES AND PROCESS OF MAKING SAME.

Application filed November 12, 1921. Serial No. 514,717.

*To all whom it may concern:*

Be it known that I, JOSEPH A. BOWERMAN, a citizen of the United States of America, residing at Wilbraham, in the county of Hampden and State of Massachusetts, have invented certain new and useful Improvements in a Valve Pad for Inner Tubes and Processes of Making Same, of which the following is a specification.

My invention relates to the manufacture of a desired combination of rubber and fabric parts and particularly to the incorporation of valve pads in rubber articles such as inner tubes for pneumatic tire casings.

It is one object of my invention to provide a valve pad which is simple in construction and which can be quickly and efficiently incorporated with the rubber stock in forming an inner tube. A more specific object of my invention is to provide a valve pad which can be incorporated in a rubber tube in such a manner as to obviate blowing or blistering in the rubber tube adjacent the valve pad during vulcanization. It is also an object of my invention to provide a new and useful method of making an inner tube having a valve pad vulcanized in the tube in an improved manner.

It is customary to make inner tubes by wrapping rubber stock about a straight mandrel and then vulcanizing the rubber while so wrapped upon the mandrel. In order that the rubber tube may be reinforced at that portion through which the valve is later to be positioned in the tube, it is necessary to provide within the tube a valve pad comprising several plies of rubberized fabric with their edges stepped off. Sometimes one or more plies of rubber are added to the valve pad. This valve pad becomes incorporated with the tube during vulcanization and becomes a part thereof. According to the customary method of construction I have found that many tubes are spoiled during vulcanization upon the mandrel because of blowing or blistering of the rubber tube near the edge of the valve pad. I believe this condition is partly due to entrapped air or gases caught between the several plies of stock forming the valve pad and partly to moisture in the fabric plies of the pad. This moisture turns into vapor during the heat of vulcanization. While the rubber tube is in the process of vulcanization the entrapped air and vapor formed in the fabric plies of the valve pad and expanded by heat move to the edges of the pad laminations and frequently break through the rubber stock at one or more points, thus causing the blistering or blowing I have referred to. According to my invention this result is avoided.

By means of my invention I build inner tubes free of blow holes or blisters with the same ease as tubes have been built according to prior practice. The departure from the usual practice, although slight, obviates a serious defect inherent in the former practice. My invention will be described with reference to the accompanying drawings; in which, Fig. 1 is a plan view partly broken away and indicating the rubber stock just prior to being rolled about a tube forming mandrel;

Fig. 2 is a cross-section taken through the line 2—2 of Fig. 1 showing in detail a valve pad having a hole through its center;

Fig. 3 is another cross-section taken through a valve pad having a hole through all but one of its laminations;

Fig. 4 is a partial section taken through a tube forming mandrel upon which a rubber tube has been rolled, showing the preferred form of valve pad which has a hole through only one fabric lamination;

Fig. 5 is a plan view of a valve pad;

Fig. 6 is a plan view of a segment of a rubber tube which has been built according to the prior practice and which indicates a blown or blistered valve pad;

Fig. 7 is an inside view of the same; and

Fig. 8 is a plan view of a segment of a finished rubber tube such as will be made by my invention, indicating the absence of blisters.

In carrying out my invention, I supply in combination with the usual rubber sheet, which is to be mounted upon a tube mandrel, a valve pad having a gas or vapor containing recess in one side thereof. The pad is positioned upon the rubber sheet so that the recess in the pad will rest against the mandrel after the combination has been mounted thereon. This arrangement forms a closed pocket which will serve as an air or vapor containing means of sufficient capacity to hold in a harmless manner the entrapped air which flows to it from between the valve pad laminations as well as the vapor generated in the valve pad during the vulcanization of the tube. It will be readily appreciated that as the air, gas or vapor in the valve pad laminations expand, their path of least resistance will be that path leading into the pocket (see Fig. 4) because the latter is within the pad and and the pad of fabric construction is more readily permeable by gas than the pure rubber stock of the tube.

The valve pads shown in cross-section in Figs. 2, 3 and 4 comprise a heavy ply of rubber stock 10 and three plies of rubberized fabric 12, 14 and 16 with their edges stepped off. In order to form an air or vapor containing recess 18, the purpose of which has already been described, an opening 20 is formed through the rubber ply 10 at approximately the center of that ply and openings 22 are formed through one or more of the fabric plies at approximately the center of those plies so as to form a recess of considerable size or sufficient capacity for my purpose. The size and shape of the recesses in the valve pads of the same size may vary from time to time, the main object being to form a pocket of sufficient capacity to harmlessly contain all the previously described gases and vapors expanded during the vulcanization of the rubber tube. The openings 22 in the fabric plies are preferably cut therein after the fabric has been rubberized. In this way the edges of the openings are formed by the unrubberized threads of the fabric and each thread serves as a convenient path of least resistance from the interior of the valve pad to the closed pocket between it and the mandrel.

In mounting this laminated valve pad in combination with the rubber sheet upon a tube vulcanizing mandrel, I place it upon the sheet 26 near the edge 30 as shown in Figs. 1, 2 and 3. The recess 18 of the pad faces away from the sheet. The mandrel 28 is laid over the edge 30 of the sheet in the usual manner and the rubber is wrapped about the mandrel by rolling the mandrel over it. The recess 18 by this means has its open end closed by the mandrel so as to form the pocket I have described. The mandrel is of usual form and any part of its surface will cooperate with recess 18 to form the desired pocket. The mounted combination is next vulcanized upon the mandrel and the valve pad becomes bodily incorporated in the rubber during such vulcanization. The closed pocket will receive and being of sufficient capacity will hold the air, gas, or vapor in a harmless manner during vulcanization. When the tube has been vulcanized it is peeled off the mandrel by turning it inside out. The valve pad will then have the openings 20 and 22 upon the outside of the tube, and of course the gas or vapor will escape. While the latter has been held within the valve pad during vulcanization the final result is the same as if the gases had harmlessly escaped into the atmosphere during vulcanization. The means used to bring about the final result however is more convenient and economical than if direct venting means were used.

The blowing or blistering of the rubber tube around the valve pad, which blowing or blistering occurs frequently in the former practice, is indicated in Figs. 6 and 7. Fig. 6 shows several blow holes 32 which have broken through to the outside of a rubber tube 34 around the valve pad 36 while Fig. 7 shows other blow-holes 32 which have broken through to the inside of the rubber tube.

My invention is capable of general application on straight or curved mandrels. In addition it contributes effectively to economy particularly where it is desired to vulcanize tubes with valve pads therein and avoid expensive forms of pressure applications to the tubes during vulcanization.

Having thus described my invention, I claim:

1. The method of making laminated articles of fabric and rubber which consists in forming a recess in the fabric, then laminating the fabric and rubber on a mandrel or mold surface with the recess closed by the latter, and vulcanizing.

2. The method of making laminated articles of fabric and rubber which consists in cutting a hole in rubberized fabric so as to leave the edges unrubberized, laminating the fabric and rubber layers on a mandrel or mold surface with the hole facing and closed at one end by such surface, and vulcanizing the article thus positioned.

3. In a method of making an inner tube the steps which consist in providing a vent pocket or recess in a laminated fabric valve pad, applying the valve pad and the unvulcanized rubber tube on a mandrel for vulcanization with the vent pocket or recess completely closed, vulcanizing the pad and tube into a unit, and then opening the vent pocket.

4. In a method of making an inner tube, the steps which consist in cutting a hole at least partially through the rubberized fabric laminations of a valve pad so as to leave the edges of said hole unrubberized, locating the valve pad between a mandrel and a surrounding imperforate unvulcanized tube, and vulcanizing the tube and pad together.

5. In a method of making an inner tube the steps which consist in providing in a laminated rubberized valve pad a vent pocket or recess having its fabric sides unrubberized, applying said pad and an unvulcanized tube to a mandrel with the vent pocket closed, but with the ends of the gas paths of small resistance along the fabric threads leading into the pocket, and vulcanizing the two together.

6. In a method of making an inner tube, the steps which consist in cutting a hole in the rubberized fabric laminations of a valve pad so as to leave the edges of the hole unrubberized, building the pad into the unvulcanized rubber tube, locating the tube and pad together on a mandrel so that one end of the hole in the pad laminations is closed by the mandrel and the other by the tube rubber, and vulcanizing the tube and pad together, whereby gases from the fabric laminations are afforded a path into the pocket thus formed by the hole and are held there harmlessly during vulcanization.

JOSEPH A. BOWERMAN.